United States Patent
Jin et al.

(10) Patent No.: US 7,620,423 B2
(45) Date of Patent: Nov. 17, 2009

(54) METHOD AND SYSTEM FOR CREATING BEAMFORMED CHANNELS IN A MULTI-INPUT MULTI-OUTPUT NETWORK

(75) Inventors: Hang Jin, Plano, TX (US); Ahmadreza Hedayat, Allen, TX (US); John Grabner, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 378 days.

(21) Appl. No.: 11/546,922

(22) Filed: Oct. 12, 2006

(65) Prior Publication Data

US 2007/0129016 A1 Jun. 7, 2007

Related U.S. Application Data

(60) Provisional application No. 60/748,700, filed on Dec. 7, 2005.

(51) Int. Cl.
*H04M 1/00* (2006.01)
(52) U.S. Cl. ............... 455/562.1; 455/101; 455/103; 455/67.11; 455/67.13; 455/226.1
(58) Field of Classification Search .......... 455/101, 455/103, 67.11, 67.13, 562.1, 226.1, 226.3
See application file for complete search history.

(56) References Cited

U.S. PATENT DOCUMENTS

| | | | |
|---|---|---|---|
| 6,927,728 B2 * | 8/2005 | Vook et al. ............ 342/377 |
| 2004/0066754 A1 * | 4/2004 | Hottinen ............... 370/252 |
| 2004/0196805 A1 * | 10/2004 | Lee ...................... 370/329 |
| 2005/0107057 A1 * | 5/2005 | Sun ...................... 455/272 |
| 2008/0075033 A1 * | 3/2008 | Shattil .................. 370/328 |

\* cited by examiner

*Primary Examiner*—Temica M Beamer

(57) ABSTRACT

The present invention discloses a method and system for signal communication in a multi-input multi-output network. The method creates beamformed channels by calculating one or more beamforming weighting vectors corresponding to one or more antennas on the receiving wireless station based on the predetermined receiving signals. The transmitting wireless station transmits one or more beamformed transmission signals to the receiving wireless station using the calculated beamforming weighting vectors for targeting at the antennas thereon, thereby creating two or more detectably uncorrelated transmission signals received at the receiving wireless station.

20 Claims, 3 Drawing Sheets

METHOD AND SYSTEM FOR CREATING BEAMFORMED CHANNELS IN A MULTI-INPUT MULTI-OUTPUT NETWORK

CROSS REFERENCE

The present application claims the benefit of U.S. Provisional Application Ser. 60/748,700, which was filed on Dec. 7, 2005.

BACKGROUND

The embodiments of the present invention relate to wireless communication networks, more specifically, Multiple-Input-Multiple-Output (MIMO) communication networks. It is general understanding that a wireless stations refers to either a mobile terminal or a fixed terminal such as a base station.

A typical MIMO network is comprised of a base station (BS) with multiple antennas and multiple mobile stations (MS), at least one of which has multiple antennas. Assuming that there are M antennas at the BS and N antennas at one of the MSs, there are M×N MIMO channels between the BS and the MS. Let $y_i$ denote the signal received by antenna i on the MS, $x_j$ the signal transmitted by antenna j on the BS, and $n_i$ the channel noise received by antenna i on the MS.

The receiving signals at the MS are illustrated with the following equation: Y=H*x+n (1), where Y is a vector representing signals $Y=(y_1, \ldots, y_N)$ received by the N antennas on the MS, x is the vector representing signals $x=(x_1, \ldots, x_M)$ transmitted from M antennas on the BS, H is the M×N channel matrix between the BS and the MS, and n is a vector representing channel noise $n=(n_1, \ldots, n_N)$ received by N antennas on the MS.

The MIMO channel matrix H can be decomposed with the singular value decomposition (SVD) method $H=U*D*V^+$ (2), where U and V are unitary matrices, operator $(.)^+$ denotes conjugate transpose of the enclosed vector, and matrix D contains the channel singular values of H, which are the square roots of the eigenvalue of $H*H^+$ and $H^+*H$. The well-known terminologies, such as unitary matrix and conjugate transpose present in the disclosure, should be apparent to one having skills in the art and have not been described in details in order to avoid obscuring the disclosure.

By substituting H in equation (1) with equation (2), the equation (1) becomes $Y=H*x+n=U*D*V^+*x+n$ (3).

By multiplying equating (3) with $U^+$, equation (3) is transformed into equation (4).

$$U^+ * Y = \tilde{Y} = U^+ * U * D * V^+ * x + U^+ * n \quad (4)$$
$$= D * V^+ * x + U^+ * n$$
$$= D * \tilde{x} + \tilde{n},$$

where $\tilde{Y} = U^+ * Y$, $\tilde{x} = V^+ * x$, and $\tilde{n} = U^+ * n$.

The operation described above creates L parallel channels, and the receiving signal $\tilde{y}$ of each channel is described by $\tilde{y}_i = d_i * \tilde{x}_i + \tilde{n}_i$ (5), where i=1, 2, ... L, $d_i$ is the channel fading coefficient, $\tilde{x}_i$ is the transmission signal, and $\tilde{n}_i$ is the channel noise. L is the rank of channel matrix H of the MIMO network and $L \leq \min(M, N)$.

Equation 5 shows that there exist L parallel channels ($L \leq \min(M, N)$) between the BS and the MS with each channel independently carrying one signal on the same frequency simultaneously. If the signals in the L channel are different from each other, there will be a L fold of increase in the channel capacity. If the signals in the all L channel are all the same, there will be L fold increase in the diversity.

One common practice of the MIMO network is to group the L channels into several subgroups. The same signal is sent over all channels within a subgroup but each subgroup carries a different signal. The practice provides space-time coding to increase diversity as well as spatial multiplexing to increase channel capacity.

The correlations among the signals received by the receiving antennas depend on the channel conditions and the degree of correlations determines the rank of channel matrix H. Channel matrix H, in turn, determines the performance of the MIMO network.

In an environment with severe multipath, the signals received by every antenna on the MS are highly uncorrelated. Consequently, MIMO channel matrix H has a high rank. In a good environment where the MS is in the Line-Of-Sight (LOS) range, the signals received by every antenna on the MS are highly correlated. As a result, MIMO channel matrix H has a lower rank. The lowest rank for channel matrix H is one, i.e., all signals received by different antennas are correlated. In this case, the MIMO network is degenerated into a conventional Single-Input-Single-Output (SISO) system.

The conventional MIMO network faces at least two challenges: the overhead, incurred in the link adaptation process, and the contradiction between the requirement for a channel matrix H with a higher rank and that for good signal to noise ratio (SNR) to have better performance.

The correlations among the signals received by the receiving antennas change with the environment. One of the functions of the MIMO network is to create L parallel MIMO channels in the link adaptation process after channel matrix H passes some predetermined tests, one of which measures how long the channel matrix H holds a rank L. In order to determine how long the channel matrix H holds a rank L, the MIMO network monitors the channel condition constantly and changes the MIMO network configuration accordingly. This results in the instability of the MIMO channels and incurs a lot of overhead in exchange for control signals.

SNR is one of the factors affecting the performance of the MIMO network. An environment with little propagation impairment where the MS is in the LOS range or there is little multipath or attenuation in the signal path, has better SNR. On the other hand, an environment with severe multipath offers a channel matrix with a higher rank. In reality, it is rare to have a situation in which an environment offers both good SNR and severe multipath. The method for beamformed MIMO network disclosed in the present invention provides a better solution for aforementioned issues.

SUMMARY

The present invention discloses a method and system for signal communication in a multi-input multi-output network. The method creates beamformed channels by calculating one or more beamforming weighting vectors corresponding to one or more antennas of the receiving wireless station based on the receiving signals. The transmitting wireless station transmits one or more beamformed transmission signals to the receiving wireless station using the calculated beamforming weighting vectors for targeting at the antennas thereon, thereby creating two or more detectably uncorrelated transmission signals received at the receiving wireless station.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. A clearer conception of the invention and of operation of system provided with the invention, will become more readily apparent by referring to the exemplary, and therefore non-limiting, embodiments illustrated, in the drawings, wherein like reference numbers (if they occur in more than one view) designate the same elements. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention. The following detailed description does not limit the invention. Instead, the scope of the invention is defined by the appended claims.

The invention discloses a method to create beamformed channels in a MIMO network to address the issues described above. The method disclosed in the invention modifies channel matrix H to improve and stabilize its rank and create L virtual beamformed channels in an M×N MIMO network.

Specifically, in the beamformed channel method, the transmitting station applies an antenna-specific beamforming weighting vector to signals before transmitting antennas send beamformed signals to receiving antennas. The antenna-specific beamforming weighting vector is chosen in such a way that the signals received by different receiving antennas will be uncorrelated even in the good environment where there is little multipath and the receiving signals are highly correlated.

In fact, the beamformed channel method generates a virtual MIMO channel matrix H that has a higher and more stable rank L and turns the M antennas that transmit signals in the M×N MIMO network into L virtual transmitting antennas, where L≦min(M, N). The beamformed MIMO method effectively creates uncorrelated signals for the receiver antennas under the highly correlated channels.

The invention discloses a method to generate L beamformed channels in an M×N MIMO network between a wireless station A with M antennas and a wireless station B with N antennas, where L≦min(M, N).

Figure 1:
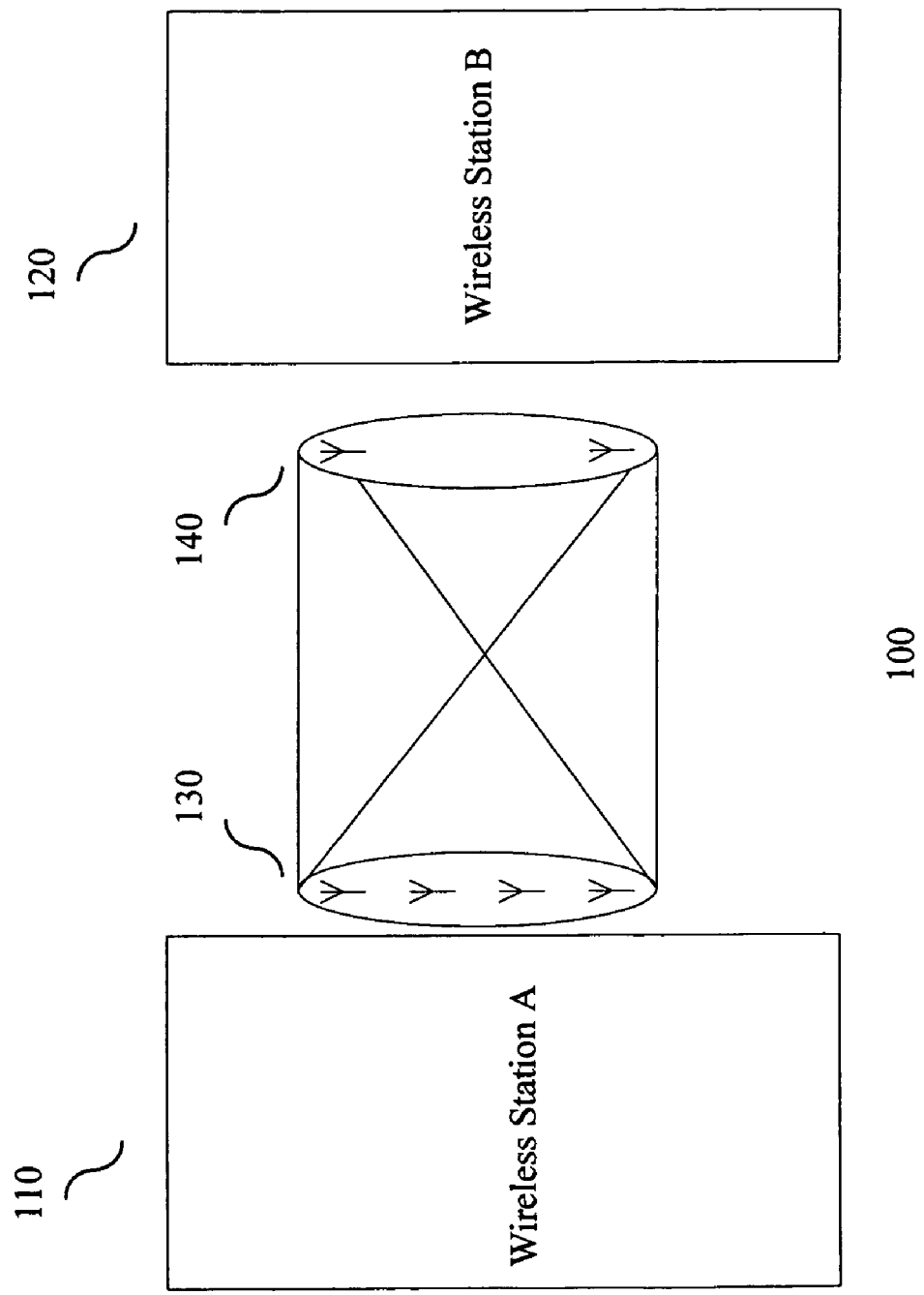
FIG. 1 illustrates a MIMO network with multiple antennas.

FIG. 1 shows a typical M×N MIMO network comprised of at least two wireless stations, A 110 with M antennas 130 and B 120 with N antennas 140. In a good environment with little multipath, the signals received by N antennas 140 are highly correlated and the channel matrix has a lower rank. In other words, the MIMO network degenerates into a Single-Input-Single-Output network.

Figure 2:
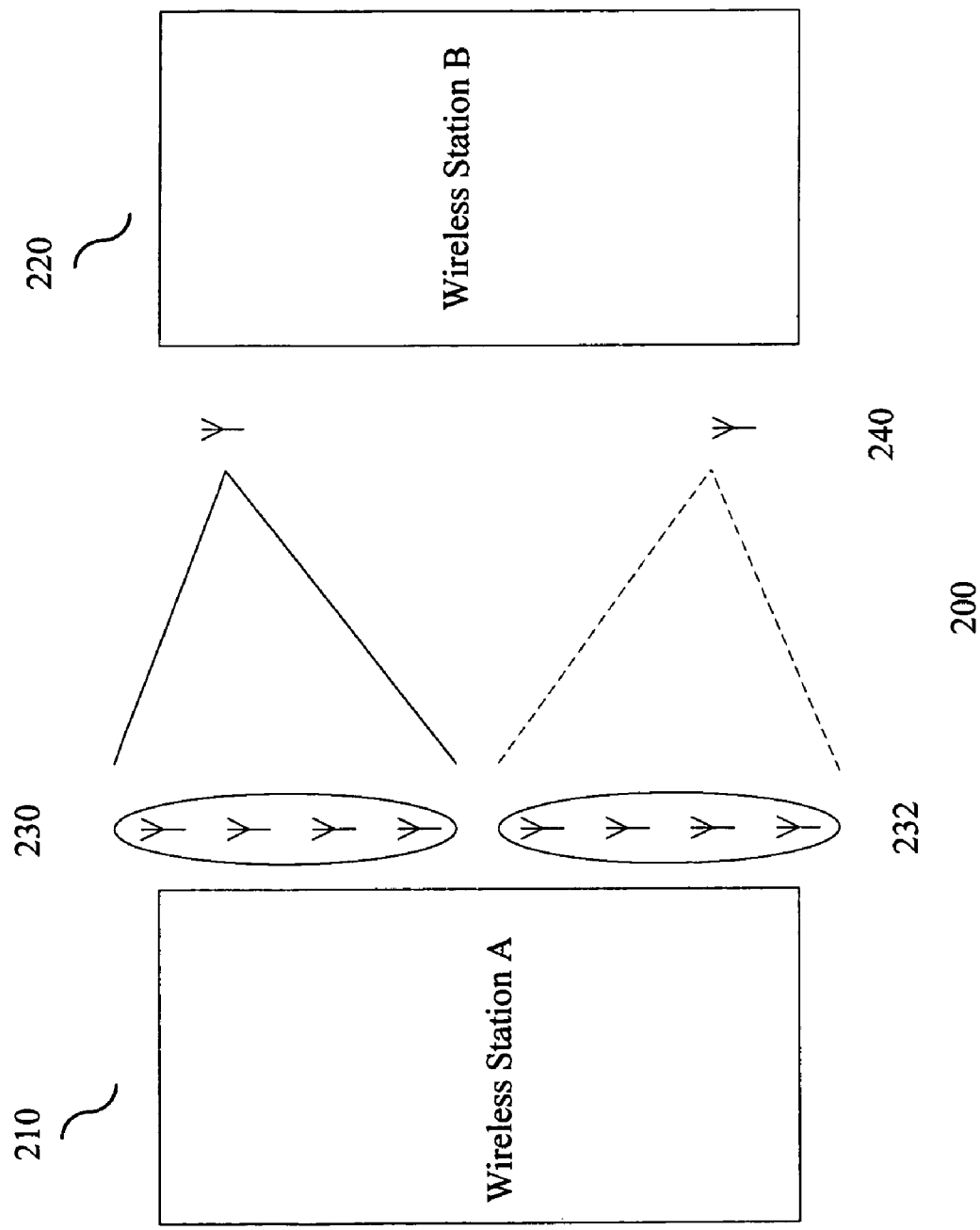
FIG. 2 illustrates a MIMO network with beamformed channels.

FIG. 2 shows a typical M×N MIMO network comprised of at least two wireless stations, A 210 with M antennas 230 and B 220 with N antennas 240. Applying the beamformed channel method disclosed in this invention, the M×N MIMO network has L beamformed channels 230 and 232, where L<min (M, N). Each of the N receiving antennas receives signals that are beamformed from M transmitting antennas. Applying beamforming weighting vectors to M transmitting antennas result in highly uncorrelated signals received by N antennas in a good environment. The uncorrelated signals produce the channel matrix of a higher rank and improve the performance of the M×N MIMO network. FIG. 2 shows two beamformed channels from wireless station A to wireless station B.

Figure 3:
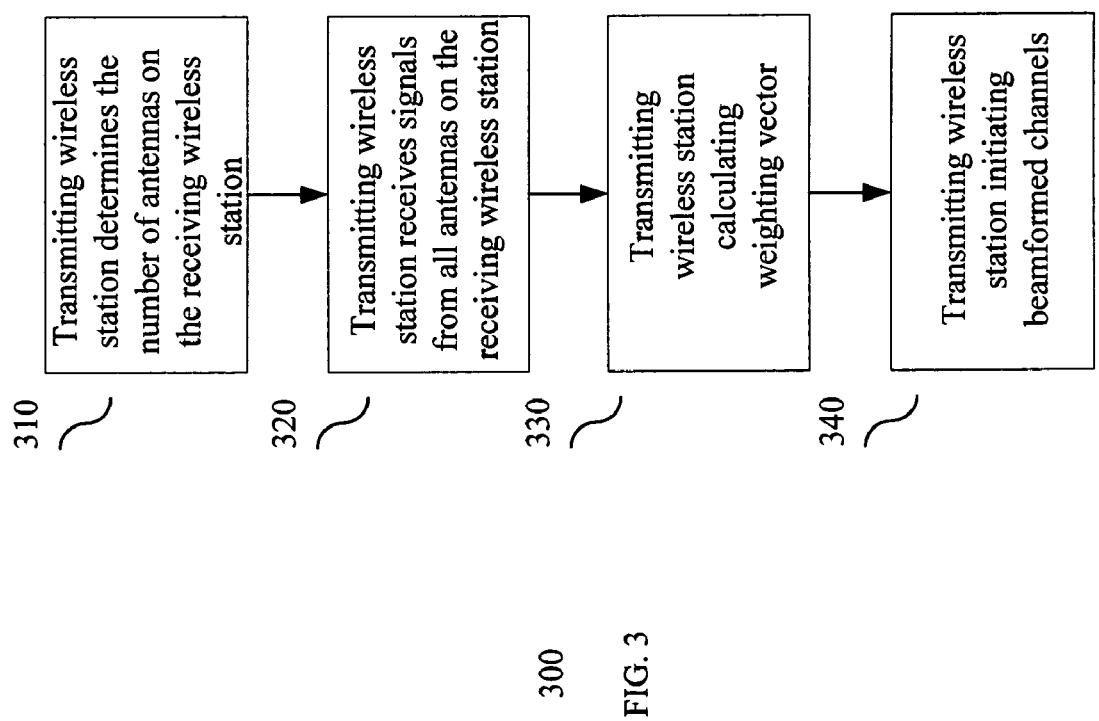
FIG. 3 is a flow diagram illustrates the beamformed channel method.

FIG. 3 is a flow diagram illustrates the beamformed channel method. The description is based on the MIMO network illustrated in FIG. 2, wherein like reference numbers (if they occur in more than one view) designate the same elements. The beamformed channel is unidirectional, i.e., the beamformed channels from wireless station A 210 to wireless station B 220 are different from the beamformed channels from wireless station B 220 to wireless station A 210. The flow diagram shows how to create the beamformed channels in one direction only. For the clarity of the description, wireless station A 210 in FIG. 2 is designated as the transmitting wireless station and wireless station B 220 in FIG. 2 is designated as the receiving wireless station.

In step 310, the transmitting wireless station determines the number of receiving antennas on the receiving wireless station. Assume that the receiving wireless station has N antennas and the transmitting wireless station has M antennas. Assuming that N>M, the transmitting wireless station must select M antennas out of the N antennas on the receiving wireless station in order to create L beamformed channels, where L<min(M, N). If M>N, skip step 310 and continue to step 320.

There are two approaches to select M receiving antennas out of the N receiving antennas on the receiving wireless station, if N>M: (1) to find the M antennas that are located far from each other on the receiving wireless station and (2) to mask out the undesirable antennas on the receiving wireless station by applying a weighting vector, created by the transmitting wireless station. The second approach ensures that the transmitting wireless station only observes M antennas out of the N antennas on the receiving wireless station. To abridge the description, assume M≧N.

In step 320, the M antennas 230 on transmitting wireless station A 210 receive the signals transmitted from the N antennas 240 on receiving wireless station B 220. The vector representing the signal transmitted from antenna i on receiving wireless station B and received by transmitting wireless station A is denoted as $S_i$, where $S_i=(S_{i1}, S_{i2}, \ldots, S_{i(M-1)}, S_{iM})$, and $S_{ij}$ represents the signal transmitted by antenna i on receiving wireless station B and received by antenna j, where j=1 . . . M on transmitting wireless station A.

In step 330, transmitting wireless station A 210 calculates beamforming weighting vector $W_i$ for antenna i on receiving wireless station B 220 with all $S_i$. Weighting vector $W_i$ for antenna i is representing by $W_i=(W_{i1}, W_{i2}, \ldots, W_{i(M-1)}, W_{iM})$, where $Norm(W_i)=1$. One having skills in the art would recognize that the Norm(.) represents a vector norm.

Weighting vector $W_i$ is calculated in such a way that $S_i$ is treated as the desired signal and the rest of the signals $S_j$'s, where j=1, . . . , n excluding i, are regarded as undesirable signals. Weighting vector $W_i$ is optimized for antenna i with the objective that the beamformed gain for antenna i is larger than the beamformed gain for all the other antennas with a pre-selected value $\alpha_i$, where $\alpha_i>1$. Weighting vector $W_i$ can be calculated by the following optimization process to find $$\underset{W_i \in \Phi_i}{\text{MAX}(SNR_i)}\bigg|_{W_i * \tilde{S}_i * \tilde{S}_i^H * W_i^H \geq \alpha_i \cdot W_i * \tilde{S}_j * \tilde{S}_j^H * W_i^H; j \neq i, j=1 \cdots N} \quad (5)$$

Where $SNR_i$ is the signal to noise ratio of beamformed channel i generated with beamforming weighting vector $W_i$ for antenna i. $\Phi_i$ is a set that contains all possible weighting vectors of $W_i$. The superscript H means Hermit transpose, and $\tilde{S}_i$ is the normalized $S_i$, where $\tilde{S}_i = S_i / \|S_i\|$.

Equation 5 is iterated several times for each antenna j and each iteration involves a different pre-selected $\alpha_j$ in order to find the best combination of $SNR_i$ and $\alpha_j$. If there is no acceptable $SNR_i$ with an acceptable $\alpha_j$ for antenna j, then wireless station A 210 can not create a beamformed channel to de-correlate the signals received by antennas i and j because the signals transmitted from antennas i and j on receiving wireless station B 220 are highly correlated or because the signal to noise ratio is very poor. If this is the case, transmitting wireless station A 210 will not initiate the beamformed MIMO operation. Instead, a space-time coding may be used.

The minimum acceptable $\alpha_i$ can be set as 1.1 (i.e., less than 90% correlation) for the signals received by antennas i and j on receiving wireless station B 220. The same procedure is repeated and applied to all N antennas on receiving wireless station B 220. If all beamformed channels are established, transmitting wireless station A 210 applies the beamforming weighting vector $W_i$ to the M antennas when transmitting a signal to antenna i on receiving wireless station B 220.

Based on the receiving signals transmitted by receiving wireless station B, transmitting wireless station A calculates the beamforming weighting vector $W_i$ for the receiving antenna i on receiving wireless station B. The signals could be sent from antennas i and j of receiving wireless station B and received by transmitting wireless station A in one of the following two ways:

First, the signals are transmitted from the N antennas on receiving wireless stations B and they overlap each other in the time and frequency domains. In this case, in order for transmitting wireless station A to identify the source of each of the signals sent by the antennas on receiving wireless station B, the signal from each antenna on receiving wireless station B needs to carry a pre-determined unique training sequence.

Based on priori knowledge, transmitting wireless station A extracts the training sequences with a coherent correlation or some other algorithms, such as Maximum Likelihood (ML). Transmitting wireless station A constructs the beamforming weighting vectors based on the extracted training sequences. The transmission power for the training sequences could be higher than normal signals to facilitate the extraction of training sequence.

Second, the signals are transmitted from the N antennas on receiving wireless stations B and they overlap each other partially or do not overlap at all in the time and frequency domains. In this case, the method for transmitting wireless station A to retrieve the receiving signals from the N antennas on receiving wireless station B would be simpler.

Transmitting wireless station A and receiving wireless station B pre-determine the allocation of the transmission region for each of the antennas on receiving wireless station B in the time and frequency domains. For example, within a cell the transmission region for each antenna on receiving wireless station B is fixed or it is assigned dynamically. For different cells, there is no overlapping transmission region, or the transmission regions for different cells are randomized to minimize the chance of overlapping.

In this case, transmitting wireless station A receives the signals transmitted by the antennas on receiving wireless station B according to a pre-determined arrangement for each antenna. Transmitting wireless station A uses the receiving signals to construct beamforming weighting vectors for the antennas on receiving wireless station B. The transmission power for signals in the non-overlapping transmission region could be higher to facilitate the weighting calculation.

One exemplary 4×2 MIMO network where the BS has four antennas and the MS has two antennas is described below. The example shows a beamformed MIMO network that has two beamformed channels from the BS to the MS and two beamformed channels from the MS to the BS.

The MS follows the procedure described in FIG. 3 to create two beamformed channels from the MS to the BS. Similarly, the BS follows the procedure described in FIG. 3 to create two beamformed channels from the BS to the MS. In the case where the BS has more antennas than the MS, the MS applies a weighting mask to select two antennas on the BS, as described in step 310.

In a conventional MIMO network, if both the BS and the MS are in the LOS range, the receiving signals on both the BS and the MS—are highly correlated. As a result, having multiple receiving antennas would only yield limited improvement in the performance of the MIMO network.

With two beamformed channels from the BS to the MS, even in the LOS range, the beam width of the transmission signal is reduced by four times and the beam length of the transmission signal is increased 8 times (with 4 antenna beamforming). The receiving signals on MS antennas 1 and 2 are de-correlated and receiving antenna gain of the MIMO network from the BS to MS increases.

With the beamformed channels from the MS to the BS, even in the LOS range, the beam width of the transmission signal from the MS to the BS is reduced by 2 times and the beam length of the transmission signal from the MS to the BS is increased 4 times (with 2 antenna beamforming). The receiving signals of BS antennas 1 and 2 are de-correlated and receiving antenna gain of the MIMO network from the MS to the BS increases.

One of the advantages of the invention is that by modifying channel matrix H of the conventional MIMO network, the beamforming method allows the conventional MIMO network to maintain good performance even in the situation where the receiving signals are highly correlated due to the wireless stations being in the LOS range.

The Maximum Likelihood (ML) method is often the preferred method for processing the signals received from multiple antennas, but the ML method is quite complex. To reduce the complexity of processing the receiving signals from multiple antennas, two alternative methods can be used.

The first method is to apply the beamforming weighting vector on the receiving signals. For example with 4 antennas on the BS and 2 antennas on the MS, weighting vectors $W_1$ and $W_2$ can be applied to the vector $S_1 = (S_{11}, S_{12}, S_{13}, S_{14})$ and $S_2 = (S_{21}, S_{22}, S_{23}, S_{24})$ that represent the signals which are transmitted from antennas 1 and 2 on the MS and received by the BS. A new vector, $[X_1:X_2]$, with only two elements of the receiving signals is created. $[X_1:X_2] = [W_1:W_2]S$, where $X_1$ is the weighted receiving signals from antenna 1 on the MS and where $X_2$ is the weighted receiving signals from antenna 2 on the MS.

As mentioned previously, with the selection of $\alpha_1$ and $\alpha_2$, it is possible to have low interference from MS antenna 2 with receiving signal $X_1$ and low interference from MS antenna 1 with receiving signal $X_2$.

The reduction in the number of receiving signals simplifies the subsequent processing. In a sense, the receiver actually performs something similar to the maximum ratio combining processing on the signals sent from MS antennas 1 and 2.

The second method is to use channel estimation at the receiving wireless station so that linear processing could reduce the complexity of signal detection significantly, in particular, when the receiving wireless station has more antennas than the transmitter. Zero-Forcing (ZF) and minimum mean square error (MMSE) methods can transform the vector of receiving signals in such a way that the results can be processed separately afterwards.

The beamforming method creates a beamforming weighting vector for each receiving antenna so that the effective receiving signals of the receiving antennas will have certain level of de-correlation. However, there will be certain loss of receiving antenna gain for the beamformed channel, as a result of applying the beamforming weighting vector for each receiving antenna. In fact, in the beamformed MIMO network loss of receiving antenna gain of the beamformed channel is a trade-off for the de-correlation of receiving signals of the receiving antennas.

This trade-off should not be an issue in actual deployment because the beamformed channel method de-correlates the receiving signals for receiving antennas only when the receiving wireless station is in the LOS range and the receiving signals have little attenuation. Under this condition, the loss of receive gain due to the employing of the beamformed channel method is inconsequential because the receive gain is high to begin with. When the MS is in a region that has deep fading, the correlations among the receiving signals on the receiving wireless station are low. Applying the beamformed channel method to the MIMO network to generate de-correlated signals does not affect the receiving antenna gain.

The present invention discloses a method that modifies the channel matrix of the conventional MIMO network to establish beamformed channels so that the MIMO network may benefit from having multiple antennas even under the environment that generally impairs the performance of the traditional MIMO network.

Another advantage of the present invention is that the transmitting wireless station detects the correlation of the receiving signals and determines whether it could initiate the beamformed channel without relying on the feedback from the receiving wireless station.

In order to establish a beamformed channel, the transmitting wireless station must receive signals from multiple antennas on the receiving wireless station. In the case that the receiving wireless station has only one transmitting module but multiple receiving modules, a toggle switch can be placed between antennas so that one transmitting module can transmission signals through multiple antennas.

In a conventional WiMAX system, a BS has 2 or 4 antennas, each of which has its own transmitting and receiving module. An MS has two antennas and one antenna has its transmitting and receiving modules, and the other only has a receiving module. Only downlink beamformed channel, from the BS to the MS, is supported. A toggle switch is inserted between the two antennas. The toggle switch connects the transmitting module to the two antennas according to a predetermined scheme.

One exemplary embodiment of the switching scheme is as follows. During a certain period of time within the uplink frame, denoted as period A, the toggle switch connects the transmitting module to antenna 1. During the other period of time within the uplink frame, denoted as period B, the toggle switch connects the transmitting module to antenna 2. Obviously, period A and B are not overlapped in time. Period A and period B can be in the same frame or in different frames. Period A or B can be the period of time when the normal traffic is transmitted, or the sounding period when the predetermined sounding signal is transmitted. As a result, the BS receives two uplink signals from two antennas with just one transmitting module. The BS creates beamformed channels with the MS which has two receiving antennas and just one transmitting antenna.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for signal communication in a multi-input multi-output network, the method comprising:
   receiving by a transmitting wireless station one or more predetermined receiving signals transmitted from a receiving wireless station;
   calculating one or more beamforming weighting vectors corresponding to one or more antennas of the receiving wireless station based on the predetermined receiving signals;
   transmitting one or more beamformed transmission signals to the receiving wireless station using the calculated beamforming weighting vectors for targeting at the antennas thereon, thereby creating two or more detectably uncorrelated or partially correlated transmission signals received at the receiving wireless station.

2. The method of claim 1, wherein the receiving wireless station has no more antennas than the transmitting wireless station.

3. The method of claim 1, receiving further includes masking out one or more receiving signals from one or more undesired antennas on the receiving wireless station if a total number of the antennas on the receiving wireless station is larger than that of the transmitting wireless station.

4. The method of claim 1, wherein the receiving signals further includes one or more training sequences for calculating the beamforming weighting vectors.

5. The method of claim 1, wherein calculating a beamforming weighting vector corresponding to an antenna on the receiving wireless station further includes finding the beamformed gain for the corresponding antenna that is larger than those of the other antennas.

6. The method of claim 5, wherein calculating beamforming weighting vectors for the corresponding antennas further includes finding a combination of signal to noise ratio and a predetermined threshold value.

7. The method of claim 6, wherein the threshold value is chosen to reduce the degree of correlation among beamformed signals.

8. A method for signal communication in a multi-input multi-output network, the method comprising:

receiving by a transmitting wireless station one or more predetermined receiving signals transmitted from a receiving wireless station;

calculating one or more beamforming weighting vectors corresponding to one or more antennas of the receiving wireless station in such a way that the beamformed gain for the corresponding antenna is larger than those of the other antennas based on the predetermined receiving signals;

transmitting one or more beamformed transmission signals to the receiving wireless station using the calculated beamforming weighting vectors for targeting at the antennas thereon, thereby creating two or more detectably uncorrelated or partially correlated transmission signals received at the receiving wireless station, wherein calculating beamforming weighting vectors for the corresponding antennas further includes finding a combination of signal to noise ratio and a predetermined threshold value.

9. The method of claim 8, wherein the receiving wireless station has no more antennas than the transmitting wireless station.

10. The method of claim 8, receiving further includes masking out one or more receiving signals from one or more undesired antennas on the receiving wireless station if a total number of the antennas on the receiving wireless station is larger than that of the transmitting wireless station.

11. The method of claim 8, wherein the receiving signals further include one or more training sequences for calculating beamforming weighting vectors.

12. The method of claim 8, wherein the threshold value is chosen to reduce the degree of correlation among beamformed signals.

13. An apparatus comprising:

one or more antennas for receiving one or more predetermined receiving signals transmitted from a receiving wireless station;

at least one processing module for calculating one or more beamforming weighting vectors corresponding to one or more antennas of the receiving wireless station based on the predetermined receiving signals, wherein one or more beamformed transmission signals are transmitted to the receiving wireless station using the calculated beamforming weighting vectors for targeting at the antennas thereon, thereby creating two or more detectably uncorrelated or partially correlated transmission signals received at the receiving wireless station.

14. The apparatus of claim 13, wherein the at least one processing module is configured to calculate the beamforming weight vectors from one or more training sequences contained in the predetermined receiving signals.

15. A system comprising the apparatus of claim 13 and the receiving wireless station, wherein a switch is inserted between two or more antennas on the receiving wireless station and the receiving wireless station has two or more receiving modules and one transmitting module.

16. The system of claim 15, wherein the transmitting module in the receiving wireless station is connected to one or more antennas one at a time in a dedicated transmission period.

17. The system of claim 16, wherein the receiving wireless station is configured to transmit one training sequence with normal traffic signals, and to transmit remaining one or more training sequences in the dedicated transmission period.

18. The system of claim 16, wherein the receiving wireless station is configured to transmit each training sequence by a corresponding antenna in a corresponding dedicated transmission period.

19. The method of claim 4, wherein the receiving wireless station transmits one training sequence of the one or more training sequences with normal traffic signals and any remaining training sequences of the one or more training sequences during a dedicated transmission period.

20. The method of claim 4, wherein the receiving wireless station transmits each of the one or more training sequences by a corresponding antenna in a corresponding dedicated transmission period.

* * * * *

UNITED STATES PATENT AND TRADEMARK OFFICE
CERTIFICATE OF CORRECTION

PATENT NO. : 7,620,423 B2 Page 1 of 1
APPLICATION NO. : 11/546922
DATED : November 17, 2009
INVENTOR(S) : Jin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Fourteenth Day of December, 2010

David J. Kappos
*Director of the United States Patent and Trademark Office*